United States Patent
Shroff et al.

(10) Patent No.: US 10,929,807 B2
(45) Date of Patent: Feb. 23, 2021

(54) SUPPLY CHAIN LIFE CYCLE VALIDATION

(71) Applicant: Cisco Technology, Inc., San Jose, CA (US)

(72) Inventors: Chirag Shroff, Cary, NC (US); Anthony H. Grieco, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 15/067,287

(22) Filed: Mar. 11, 2016

(65) Prior Publication Data

US 2017/0262792 A1 Sep. 14, 2017

(51) Int. Cl.
*G06Q 10/00* (2012.01)
*G06Q 10/08* (2012.01)
*G06K 7/10* (2006.01)

(52) U.S. Cl.
CPC ....... *G06Q 10/087* (2013.01); *G06K 7/10297* (2013.01); *G06K 7/10366* (2013.01)

(58) Field of Classification Search
CPC .......................... G06Q 10/087; G06K 7/10297
USPC .............................................. 705/16, 28, 21
See application file for complete search history.

(56) References Cited

U.S. PATENT DOCUMENTS

| 2008/0001752 A1* | 1/2008 | Bruns ................... G06Q 10/08 340/572.1 |
| 2008/0198011 A1* | 8/2008 | Leper ................. G08B 13/1445 340/572.1 |
| 2014/0136291 A1 | 5/2014 | Bolene et al. |
| 2014/0136594 A1 | 5/2014 | Belmonte |

OTHER PUBLICATIONS

Manikonda, "NFC in Supply Chain," Blog, Oct. 9, 2012, retrieved from http://cmuscm.blogspot.com/2012/10/nfc-in-supply-chain.html, on Mar. 11, 2016, 1 page.
Vantage Point Analytics, "Analytics to Identify and Eliminate Supply Chain Fraud," retrieved from http://www.vantagepointanalytics.com/, on Mar. 11, 2016, 1 page.

* cited by examiner

*Primary Examiner* — Rokib Masud
(74) *Attorney, Agent, or Firm* — Edell, Shapiro & Finnan, LLC (57) ABSTRACT

A method includes modifying a product with a first configuration such that the product is configured in accordance with a second configuration, generating data representative of the second configuration, obtaining a signed version of the data representative of the second configuration, and storing the signed version of the data representative of the second configuration in a wireless read/write accessory that is affixed to the product, wherein the wireless read/write accessory includes a prior signed version of data representative of the first configuration.

20 Claims, 5 Drawing Sheets

SUPPLY CHAIN LIFE CYCLE VALIDATION

TECHNICAL FIELD

Embodiments described herein relate to supply chain monitoring and validation using wireless communication.

BACKGROUND

Securing the supply chain is an important challenge not only for manufacturers, but also for the ultimate end user who may desire assurance that a given product, item or device that is received through the supply chain is authentic and has not been tampered with. A label is often used on outside packaging of a product to identify the product and such a label often includes selected information to help track the product through the supply chain. The use of such a label provides an authenticity indication through its mere existence and appearance or, in some cases, by containing unique data, such as a serial number.

Notwithstanding the use of such labels, when, for example, customers, customs officials, or resellers receive a product, they have no robust way to verify the veracity of those labels. Indeed, oftentimes, verification is limited to visual inspection.

DESCRIPTION OF EXAMPLE EMBODIMENTS

Overview

In accordance with embodiments described herein there is a provided a method that includes affixing a wireless read/write accessory to a product having a first configuration, generating data representative of the first configuration, electronically signing the data representative of the first configuration to obtain a signed version of the data representative of the first configuration, and storing the signed version of the data representative of the first configuration in the wireless read/write accessory.

In accordance with another embodiment described herein a method includes modifying a product having a first configuration such that the product is configured in accordance with a second configuration, generating data representative of the second configuration, obtaining a signed version of the data representative of the second configuration, and storing the signed version of the data representative of the second configuration in a wireless read/write accessory that is affixed to the product, wherein the wireless read/write accessory includes a prior signed version of data representative of the first configuration.

Example Embodiments

Securing the supply chain is an important challenge not only for manufacturers, but also for the ultimate end user who may desire assurance that a given product, item or device that is received through the supply chain is authentic and has not been tampered with. A label is often used on product packaging to identify the product and such a label often includes selected information to help track the product through the supply chain. The use of such a label provides an authenticity indication through its mere existence and appearance or, in some cases, by containing unique data, such as a serial number.

Notwithstanding the use of such labels, when, for example, customers, customs officials, or resellers receive a product, they have no robust way to verify the veracity of the label. Indeed, oftentimes, verification is limited to visual inspection. That is, a label and any associated data is not linked to any other features or artifacts of the product and, as such, acts as another "atomic" piece of data for verification. Additionally, a label is ineffective to identify the several possible supply chain entities or organizations (e.g., resellers, customs, etc.) that may have "touched" the product.

The embodiments described herein enable manufacturers, customers, partners, and/or customs agents, among others, to more easily validate the authenticity of the products received through a supply chain as well as to better understand which entities have interacted with those products. As will be described below, the validation is performed independently and can be accomplished with the product powered off so there is no burden associated with opening product packaging and powering on the product to validate authenticity. It is also possible for individual entities in the supply chain to provide additional information about modifications, if any, made to the product, as the product travelled through the supply chain.

There are three general aspects of the supply chain life cycle validation techniques described herein. There is (1) a setup aspect including early and late stage manufacturing, (2) a reconfiguration aspect, where reconfiguration of the product might be performed by, e.g., a reseller, and (3) an end user aspect, where an end user can validate the configuration of the product and where the product itself can perform self validation upon power up.

(1) Setup

In the early manufacturing stage of the setup aspect, electronic "fingerprints" of a manufactured product (e.g., a network router, switch) that are unique (e.g., media access control (MAC) Address, serial number, unique chip IDs, etc.) are stored in storage locations (e.g., in an EEPROM or other similar device) of the product and a back end server. Public key material associated with this process is also stored in a protected storage location and made available for public use.

During late stage manufacturing, labels associated with the product are generated and placed on product packaging. The information for the labels is obtained from the back end server. The labels may indicate serial number, MAC address, etc., and they may be provided on respective layered cartons/boxes. Labels may also include anti-counterfeit labels that have their own serial numbers. A trusted application is then employed to gather the information used to generate the labels into, e.g., a single file which is then signed by a manufacturer's signing server using a private key associated with the above-mentioned public key. A reader/writer device (e.g., a near-field communication (NFC)-capable device, such as a smart phone) is then used to transfer the signed file or information to a read/write accessory (e.g., an NFC tag) that is affixed to the product, which could be fully packaged at this point.

(2) Reconfiguration

With an NFC tag loaded with the signed information, an application running on an NFC capable smart phone, can subsequently scan any number of the labels (including any outer pack-out label), retrieve the signed data from the NFC tag affixed to the product and verify consistency between the label(s) and the signed information, or consistency between actual and expected time spent en route from one location to another, among other possible characteristics. In the event a reseller or partner makes changes to or modifies the product, that downstream reseller or partner in the supply chain can itself gather any new configuration information into a new file, obtain a signed version of it, and load the signed version on the NFC tag. This will produce an artifact trail of those that have "touched" the product. In this way, a further downstream entity, including the final end user can confirm consistency between labels and the signed information on the NFC tag and actual inspection of the product.

(3) End User

Once a product finally arrives at an end user, that end user can likewise use a reader/writer device (e.g., a smart phone) to obtain the signed information from the NFC tag and confirm the validity of labels and consistency of the product through visual inspection once unpacked.

Additionally, during normal system operation, at power on, the product itself can be configured to retrieve MAC address, serial numbers, etc. from a local storage device (e.g., EEPROM) and compare that information to the signed data stored in the NFC tag. A mismatch can be flagged so that the end user can take appropriate action.

More specific details of the elements and functionality of the instant embodiments are described below.

Figure 1:
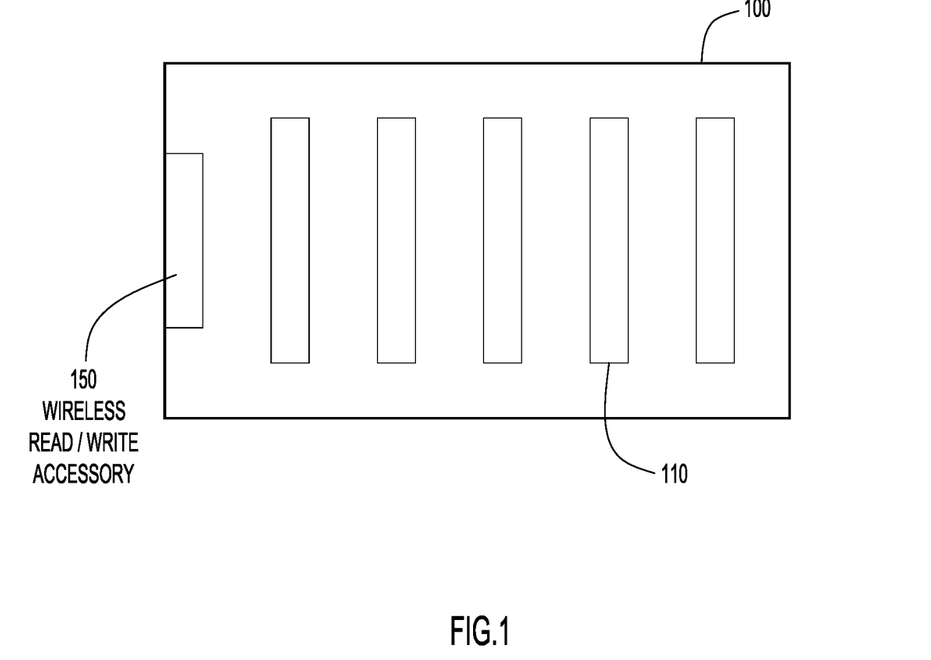
FIG. 1 depicts a product having a wireless read/write accessory affixed thereto according to an example embodiment.

FIG. 1 depicts a product having a wireless read/write accessory affixed thereto that is configured to store configuration and other information about the product, according to an example embodiment. Product 100 is a manufactured good or apparatus. In one possible example, product 100 is a network router or switch that includes a plurality of slots 110 that can be populated, respectively, with line cards (not shown) to enable the router or switch to communicate over a network, such as a local area network (LAN), wide area network (WAN) and the like. As further shown, product 100 includes a read/write accessory 150 that is affixed to, e.g., a chassis of the router or switch. Read/write accessory 150 may comprise a processor, memory and network interface (discussed further in connection with FIG. 6). In one implementation, read/write accessory 150 is a near field communication (NFC) device that is configured to enable a corresponding reader/writer device 500 (shown in FIG. 2 and in FIG. 6) to read from the NFC device and to store data on the NFC device. Read/write accessory 150 is alternatively referred to herein as NFC device 150.

Figure 2:
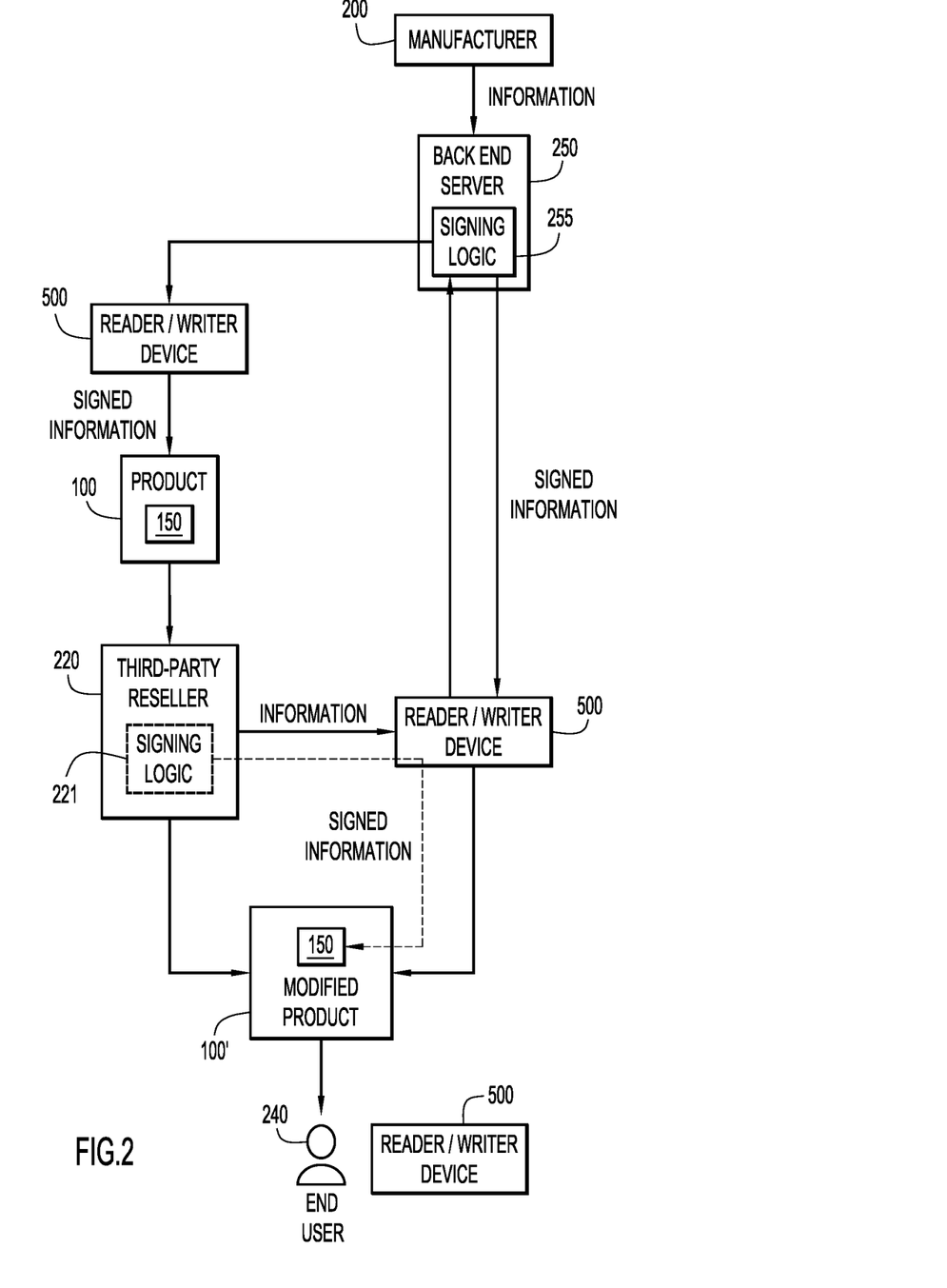
FIG. 2 depicts a supply chain and communication among the wireless read/write accessory, a reader/writer device and a back end server in according to an example embodiment.

FIG. 2 depicts a supply chain and selected communication among a wireless read/write accessory 150, a reader/writer device 500 and a back end server 250 according to an example embodiment. As noted, wireless read/write accessory 150 may be a NFC device that is affixed to product 100.

Manufacturer 200 manufactures product 100 and stores information about characteristics of the product in wireless read/write accessory 150. In one implementation, the information is stored in a signed form resulting from the use of a private key known only to the manufacturer. A corresponding public key is made available to others in the supply chain to confirm the authenticity of the signed information stored in wireless read/write accessory 150.

Referring to FIG. 2, in accordance with the first aspect of the embodiments described herein and as depicted, as manufacturer 200 manufactures product 100, information about the product is gathered or generated and stored on back end server 250. When product 100 is ready to be packaged and shipped, the information that has been gathered on back end server 250 is electronically or cryptographically signed by signing logic 255 and the signed information is passed to reader/writer device 500, which is configured, e.g., to communicate via a short distance communication protocol such as Near Field Communication (NFC) with wireless read/write accessory 150 that is affixed to product 100. The signed information is then stored on wireless read/write accessory 150. Packaging labels consistent with the signed information, but which do not necessarily indicate all of the same information, are also affixed to the product packaging.

Information that may be part of the signed information includes, but is not limited to:
Ship date
MAC address
Serial number
Integrated circuit chip IDs
Composition of the product, including line cards, modules,
GPS coordinates of location at which NFC device imprinting, storage took place
Unique IDs on silicon
Timestamp In accordance with the second aspect of the embodiments described herein, when a third-party reseller 220 receives product 100 it may first confirm the configuration of product 100 by using its own reader/writer device 500 to read the signed information that has been stored on wireless read/right accessory 150.

In the event third-party reseller 220 modifies product 100 third-party, reseller 220 may then generate or gather information representative of a resulting reconfiguration and obtain a signed version of that information. The signed version may be obtained by sending the gathered or generated information back to back end server 250 for signature via signing logic 255 at manufacturer 200, or may be obtained via signing logic 221 belonging to third-party reseller 220. In the latter case, third-party reseller 220 is formally authorized by manufacturer 200 to either use the private key that is used by manufacturer 200 in signing logic 255, or is authorized to have its own private key and downstream supply chain entities are informed that such a third-party reseller is in fact authorized to have its own private key for purposes of authenticating labels and products in the context of the supply chain validation techniques described herein.

In the third aspect of the embodiments described herein, an end user 240 (or any intervening entity in the supply chain), upon receipt of product 100 or modified product 100', can employ reader/writer device 500 (e.g., a smart phone) to read the signed information stored on wireless read/write accessory 150 and confirm through comparison with package labels and/or through visual inspection that the configuration of the product is consistent with that information.

Figure 3:
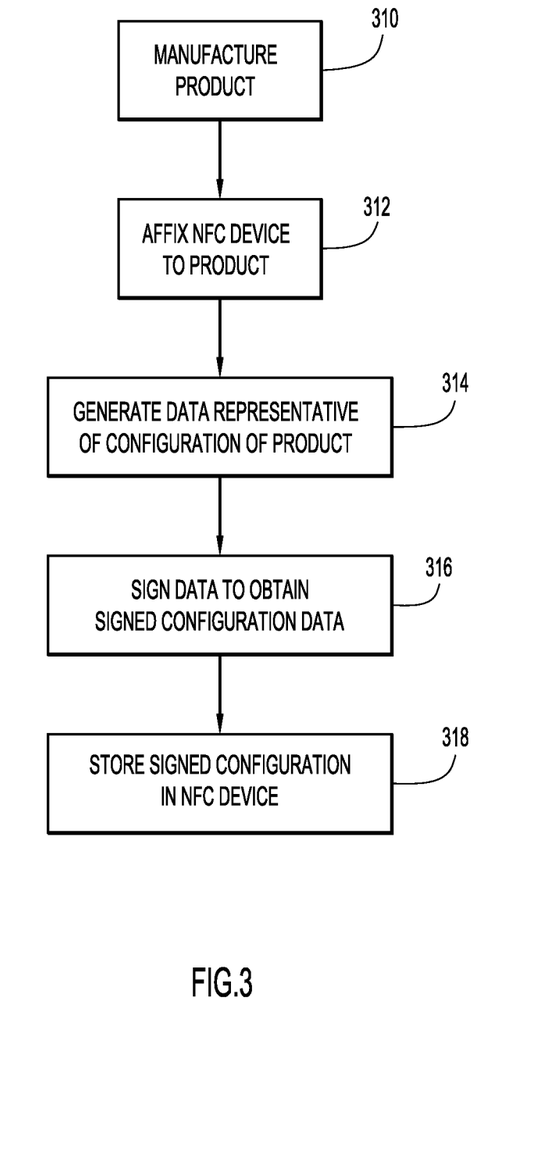
FIG. 3 is an example flow chart depicting several operations for performing supply chain life cycle validation according to an example embodiment.

FIG. 3 is an example flow chart depicting several operations for performing supply chain life cycle validation according to an example embodiment.

At 310, a manufacturer manufactures a product such as a modular device such as a network router or switch. As an example, such a switch may be a 24 port switch or a 48 port switch.

At 312, a NFC device (e.g., a chip) is affixed to the manufactured product. At 314, data that represents the configuration of the manufactured product is generated and stored, for example, on back end server 250.

At 316, the data or information that represents the configuration of the product is electronically or cryptographically signed by signing logic 255 associated with back end server 250.

At 318, the signed configuration information is stored on read/write accessory/NFC device 150. This operation may be performed by a reader/writer device such as a smart phone.

Thus, in accordance with the embodiments described herein, information about manufactured product 100 is stored in an electronically signed format on wireless read/write accessory (NFC device) 150 such that downstream entities in the supply chain can confirm consistency between the product label and the actual configuration of the product.

In addition to configuration data or information of the product, other information may also be stored in a signed form on NFC device 150. For example, a timestamp may be included, GPS coordinates, and/or a name and address of the particular entity in the supply chain that is responsible for changing product configuration or handling the product through the supply chain.

Figure 4:
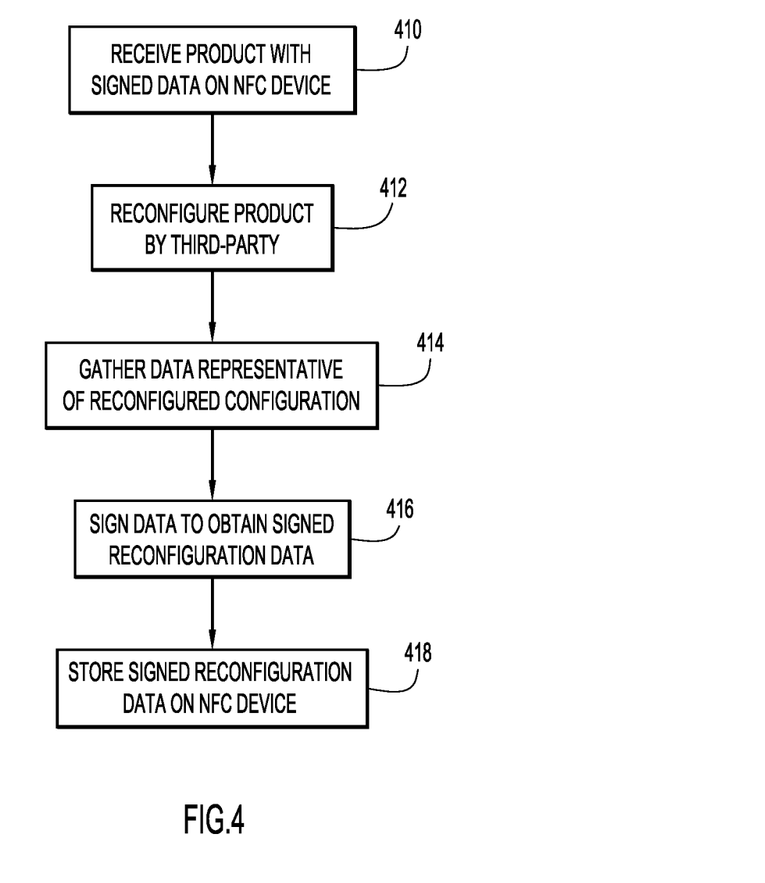
FIG. 4 is another example flow chart depicting several operations for performing supply chain life cycle validation according to an example embodiment.

FIG. 4 is another example flow chart depicting several operations for performing supply chain life cycle validation according to an example embodiment.

At 410 a product with signed information on an affixed NFC device is received at, e.g., a third-party reseller. At 412, the product is reconfigured by the third-party reseller. At 414, data or information representing the reconfigured configuration of the product is gathered.

At 416, the data representing the reconfigured configuration is electronically or cryptographically signed. The data may be signed by the original manufacturer by sending the data back to back end server 250, or may instead be signed directly by the third-party reseller where that third-party reseller is authorized by the original manufacturer and possesses either its own private key or the manufacturer's private key to sign the configuration information.

At 418, the signed reconfiguration data is loaded or stored on NFC device 150. This operation may be performed by a reader/writer device such as a smart phone. The signed reconfiguration data may be added to any existing signed data on NFC device or overwrite any existing signed data. It is noted that when the third-party reseller signs the data, the reseller may not only store the reconfiguration data on NFC device 150, but may also store a certificate associated with the reseller's public key. The certificate holds the public key of the third party reseller, and such a certificate has a corresponding issuing authority public key. This issuing authority could be the manufacturer or a known certificate issuing authority such as, e.g., Verisign. With the certificate also available on NFC device 150 a verification entity can use that information to further trust the public key of the third-party reseller.

Thus, in accordance with the embodiments described herein, information about reconfigured manufactured product 100 is stored in an electronically signed format on wireless read/write accessory (NFC device) 150 such that downstream entities in the supply chain can confirm consistency between what the product label indicates and the actual configuration of the product. Downstream entities can also then obtain insight into which entities have had access to the product.

Figure 5:
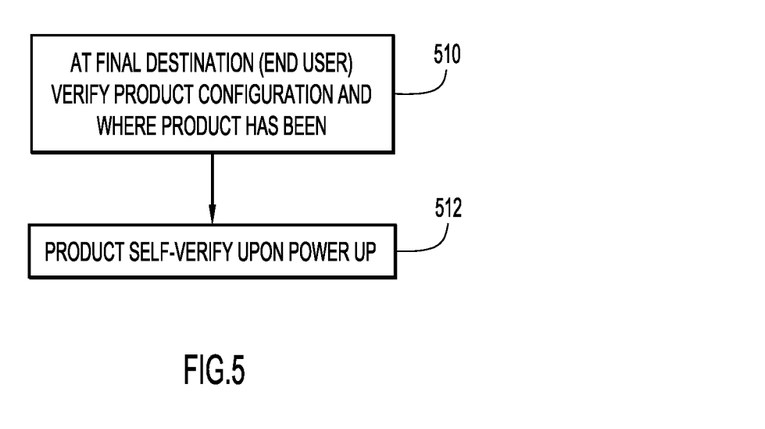
FIG. 5 is another example flow chart depicting several operations for performing supply chain life cycle validation according to an example embodiment.

FIG. 5 is another example flow chart depicting several operations for performing supply chain life cycle validation according to an example embodiment.

At 510, at a final destination for the product, namely, an end user, the product configuration can be verified through the use of the smart phone application by reading the signed reconfiguration data that has been stored on NFC device 150.

At 512, and separately, the product itself may self-verify its product configuration upon power up. More specifically, as the product powers itself up it can access the signed information that is stored on NFC device 150 and confirm that its actual configuration is consistent with the information that is stored on NFC device 150. When an inconsistency is detected, a user may be alerted.

Figure 6:
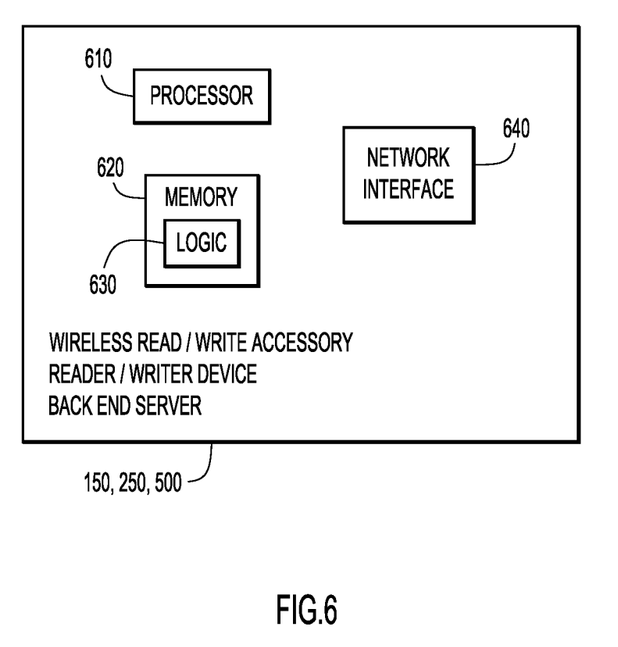
FIG. 6 depicts an apparatus that is configured to operate as any one of the wireless read/write accessory, a reader/writer device and a back end server, including logic or software instructions stored in memory for performing respective functions, according to an example embodiment.

FIG. 6 depicts an apparatus that is configured to operate as any one of the wireless read/write accessory (e.g., NFC device 150), reader/writer device 500 and back end server 250, including logic or software instructions 630 stored in memory for performing respective functions according to the example embodiment described herein.

More specifically, apparatus 150, 250 and/or 500 includes a processor 610, memory 620 to store a variety of data and software instructions 630, and a network interface unit 640 operable to communicate with other devices over a network.

Processor 610 is, for example, a microprocessor, microcontroller, application specific integrated circuit (ASIC) or that like that executes instructions for implementing the processes described herein. Memory 620 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 620 may comprise one or more tangible (non-transitory) computer readable storage media (e.g., a memory device) encoded with software comprising computer executable instructions and when the software is executed (by processor 610) it is operable to perform the operations described herein.

Thus, the embodiments described herein provide an architecture that enables supply chain life cycle validation. This is accomplished by binding, cryptographically, the label information, which is generated at the end of the manufacturing process, often after the pack out, with unique information of the product or system. That information can then be accessed throughout the life cycle of the product.

This binding of labels with product/system specific information provides downstream supply chain entities, including the ultimate end user, the ability to verify the configuration and of a product without powering up the product. Further, by allowing supply chain partners, customs agents, or any authorized entity "touching" the product to insert or add their timestamp and bits of information, end users (and intervening supply chain entities) can have visibility into how the product reached them.

To maintain confidence in the overall validation system, reader/write device 500 (e.g., a smart phone) connects to the manufacturer's back end server via a secure connection. As a result, the signed data is obtained from the back end server, or an authorized server that can perform the desired cryptographic signing. To ensure that original signed information is not overwritten on wireless read/write accessory 150, firmware could enable a "write once" behavior for certain values or locations.

In sum, in one embodiment, a method is provided including the steps of manufacturing a product with a first configuration, affixing a wireless read/write accessory to the product, generating data representative of the first configuration, electronically signing the data representative of the first configuration to obtain a signed version of the data representative of the first configuration, and storing the signed version of the data representative of the first configuration in the wireless read/write accessory. The product thereafter may be shipped to a destination at which the device may be modified to have a second configuration.

In the method, generating the data representative of the first configuration comprises accessing a back end server to obtain at least one of a list of components in the product, a serial number of the product or of at least one of the components, a media access control (MAC) address of at least one of the components, a shipping date, a geographical location of a place of manufacture, individual chip identifiers, a shipping date and a timestamp.

In the method, storing the signed version of the data representative of the first configuration in the wireless read/write accessory comprises establishing communication between the wireless read/write accessory and a reader/writer device that is in communication with a backend server.

In the method, establishing communication between the wireless read/write accessory and the reader/writer device is performed using near field communication (NFC).

In accordance with another embodiment, operations include receiving a product configured in accordance with a first configuration, modifying the product such that the product is configured in accordance with a second configuration, generating data representative of the second configuration, obtaining a signed version of the data representative of the second configuration, and storing the signed version of the data representative of the second configuration in a wireless read/write accessory that is affixed to the product, wherein the wireless read/write accessory includes a prior signed version of data representative of the first configuration. The product may thereafter be shipped to a destination at which the device may be modified to have a third configuration or to a final destination.

The method further comprises validating the first configuration of the device by reading the signed version of data representative of the first configuration that is stored in the wireless read/write accessory that is affixed to the product.

The method further comprises, when storing the signed version of the data representative of the second configuration in the wireless read/write accessory that is affixed to the product, overwriting a signed version of data representative of a first configuration of the device.

The method further comprises, when storing the signed version of the data representative of the second configuration in the wireless read/write accessory that is affixed to the product, appending the signed version of the data representative of the second configuration to the signed version of data representative of a first configuration of the product.

In the method, storing the signed version of the data representative of the second configuration in the wireless read/write accessory comprises establishing communication between the wireless read/write accessory and a reader/writer device that is in communication with a back end server.

In the method, establishing communication between the wireless read/write accessory and the reader/writer device is performed using near field communication (NFC).

In the method, obtaining a signed version of the data representative of the second configuration comprises sending the data to a backend server of an original manufacturer of the product and receiving the signed version of the data representative of the second configuration from the original manufacturer.

In the method, obtaining a signed version of the data representative of the second configuration comprises using a key authorized by an original manufacturer of the device.

The above description is intended by way of example only. Various modifications and structural changes may be made therein without departing from the scope of the concepts described herein and within the scope and range of equivalents of the claims.

What is claimed is:

1. A method comprising:
affixing a wireless read/write accessory to a product having a first configuration;
generating data representative of the first configuration;
electronically signing the data representative of the first configuration to obtain a signed version of the data representative of the first configuration;
storing the signed version of the data representative of the first configuration in the wireless read/write accessory;
causing the product to conduct a self-verification routine, upon the product powering up, including the product accessing the wireless read/write accessory and the product comparing the data representative of the first configuration in the wireless read/write accessory stored therein with an actual configuration of the product; and
determining whether the actual configuration is the same as the first configuration.

2. The method of claim 1, wherein generating the data representative of the first configuration comprises accessing a back end server to obtain at least one of a list of components in the product, a serial number of the product or of at least one of the components, a media access control (MAC) address of at least one of the components, a shipping date, a geographical location of a place of manufacture, individual chip identifiers, a shipping date and a timestamp.

3. The method of claim 1, wherein storing the signed version of the data representative of the first configuration in the wireless read/write accessory comprises establishing communication between the wireless read/write accessory and a reader/writer device that is in communication with a backend server.

4. The method of claim 3, wherein establishing communication between the wireless read/write accessory and the reader/writer device is performed using near field communication.

5. A method comprising:
modifying a product having a first configuration such that the product is configured in accordance with a second configuration;
generating data representative of the second configuration;
obtaining a signed version of the data representative of the second configuration;
storing the signed version of the data representative of the second configuration in a wireless read/write accessory that is affixed to the product, wherein the wireless read/write accessory includes a prior signed version of data representative of the first configuration; and causing the product to conduct a self-verification routine, upon the product powering up, including the product accessing the wireless read/write accessory and the product comparing the data representative of the second configuration in the wireless read/write accessory stored therein with an actual configuration of the product; and determining whether the actual configuration is the same as the second configuration.

6. The method of claim 5, further comprising validating the first configuration of the device by reading the signed version of data representative of the first configuration that is stored in the wireless read/write accessory that is affixed to the product.

7. The method of claim 5, further comprising, when storing the signed version of the data representative of the second configuration in the wireless read/write accessory that is affixed to the product, overwriting a signed version of data representative of a first configuration of the device.

8. The method of claim 5, further comprising, when storing the signed version of the data representative of the second configuration in the wireless read/write accessory that is affixed to the product, appending the signed version of the data representative of the second configuration to the signed version of data representative of a first configuration of the product.

9. The method of claim 5, wherein storing the signed version of the data representative of the second configuration in the wireless read/write accessory comprises establishing communication between the wireless read/write accessory and a reader/writer device that is in communication with a back end server.

10. The method of claim 9, wherein establishing communication between the wireless read/write accessory and the reader/writer device is performed using near field communication.

11. The method of claim 5, wherein obtaining a signed version of the data representative of the second configuration comprises sending the data to a backend server of an original manufacturer of the product and receiving the signed version of the data representative of the second configuration from the original manufacturer.

12. The method of claim 5, wherein obtaining a signed version of the data representative of the second configuration comprises using a key authorized by an original manufacturer of the device.

13. One or more non-transitory computer readable storage media encoded with software comprising computer executable instructions that, when executed, are operable to:
obtain a signed version of data representative of a second configuration of a product;
store the signed version of the data representative of the second configuration in a wireless read/write accessory that is affixed to the product, wherein the wireless read/write accessory includes a prior signed version of data representative of a first configuration of the product;

cause the product to conduct a self-verification routine, upon the product powering up, including the product accessing the wireless read/write accessory and the product comparing the data representative of the second configuration in the wireless read/write accessory stored therein with an actual configuration of the product; and
determine whether the actual configuration is the same as the second configuration.

14. The non-transitory computer readable storage media of claim 13, wherein the instructions, when executed, are further operable to:
read the signed version of data representative of the first configuration that is stored in the wireless read/write accessory that is affixed to the product.

15. The non-transitory computer readable storage media of claim 13, wherein the instructions, when executed, are further operable to:
when storing the signed version of the data representative of the second configuration in the wireless read/write accessory that is affixed to the product, overwrite the signed version of data representative of a first configuration of the device.

16. The non-transitory computer readable storage media of claim 13, wherein the instructions, when executed, are further operable to:
when storing the signed version of the data representative of the second configuration in the wireless read/write accessory that is affixed to the product, append the signed version of the data representative of the second configuration to the signed version of data representative of a first configuration of the product.

17. The non-transitory computer readable storage media of claim 13, wherein the instructions, when executed, are further operable to:
establish communication with the wireless read/write accessory and a back end server when storing the signed version of the data representative of the second configuration in the wireless read/write accessory.

18. The non-transitory computer readable storage media of claim 13, wherein the instructions, when executed, are further operable to:
establish communication with the wireless read/write accessory using near field communication (NFC).

19. The non-transitory computer readable storage media of claim 13, wherein the instructions, when executed, are further operable to:
send the data to a backend server of an original manufacturer of the product and receive the signed version of the data representative of the second configuration from the original manufacturer.

20. The non-transitory computer readable storage media of claim 13, wherein the instructions, when executed, are further operable to:
obtain a signed version of the data representative of the second configuration comprises using a key authorized by an original manufacturer of the device.

* * * * *